United States Patent [19]

Kobayashi et al.

[11] 3,731,609
[45] May 8, 1973

[54] MIRROR MECHANISM FOR A SINGLE-LENS REFLEX CAMERA

[75] Inventors: Norio Kobayashi, Kawasaki-shi; Akihiko Sato, Setagoya-ku, Tokyo, both of Japan

[73] Assignee: Nippon Kogaku K.K., Tokyo, Japan

[22] Filed: July 12, 1972

[21] Appl. No.: 271,193

[52] U.S. Cl. ...................................................95/42
[51] Int. Cl. ...............................................G03b 19/12
[58] Field of Search...........................................95/42

[56] References Cited

UNITED STATES PATENTS

| | | | |
|---|---|---|---|
| 3,628,436 | 12/1971 | Sato | 95/42 |
| 3,640,202 | 2/1972 | Nomura | 95/42 |
| 3,680,458 | 8/1972 | Nomura | 95/42 |

*Primary Examiner*—Samuel S. Matthews
*Assistant Examiner*—Michael D. Harris
*Attorney*—Joseph M. Fitzpatrick et al.

[57] ABSTRACT

A mirror mechanism for a single-lens reflex camera whose lens aperture is stopped down with the mirror fixed at its upper position through manual operation comprises a mirror drive lever 12 and a diaphragm-interlocking lever 28 both rotatably journalled to a mirror box by means of a common shaft. A pressure spring 30 is provided between the two levers to urge them into mutual engagement. A mirror lifting-fixing lever 31 is rotatably journalled to the mirror box for lifting and fixing the mirror. A mirror actuator member 33 for actuating the mirror lifting-fixing lever and the diaphragm-interlocking lever is vertically slidably mounted to the body of the camera. The mirror actuator member is formed with a retainer portion 33a for releasing the engagement between the mirror drive lever and the pressure spring when the mirror is lifted and fixed.

4 Claims, 5 Drawing Figures

PATENTED MAY 8 1973

MIRROR MECHANISM FOR A SINGLE-LENS REFLEX CAMERA

BACKGROUND OF THE INVENTION

1. Field of the Invention

This invention relates to improvements in a mirror lifting device for use in a single-lens reflex camera wherein the lens aperture is stopped down when the mirror is fixed at its upper position through manual operation.

2. Description of the Prior Art

In a single-lens reflex camera having an automatic stop-down mechanism, a mirror lifting-fixing mechanism which is independently capable of lifting a mirror is provided in addition to a quick-return mirror mechanism. When the shutter is released with the mirror lifted and fixed by such mirror lifting-fixing mechanism, the quick-return mirror mechanism, which is operated substantially under no-load conditions, may cause movement of a drive transmission member for actuating a diaphragm lever associated with the camera's lens, and also the application of a signal or the like to the shutter mechanism, to occur so quickly that the diaphragm lever cannot follow it, with the result that the shutter may be operated before the lens aperture is stopped down to a predetermined value.

To overcome the foregoing difficulty, there has already been proposed a mirror lifting device for premoving the transmission member in response to the upward movement of the mirror imparted by the mirror lifting-fixing mechanism, thereby stopping down the aperture to a predetermined value. In this known mirror lifting device, whose construction and operation will later be described, the drive mechanism must provide a relatively large driving force sufficient to rotate a mirror kick-up lever against the force of a spring when the shutter is released with the mirror fixed at its upper position. This necessitates a heavier wind-up operation to charge the drive mechanism.

SUMMARY OF THE INVENTION

We have conceived apparatus of the class described by which we are able to overcome the aforementioned disadvantages peculiar to the prior art.

Thus, our invention provides an improved mirror mechanism for use in a single-lens reflex camera having a mirror lifting device. The mirror mechanism of the present invention comprises a mirror rotatably journalled to a mirror box and normally spring-biased downwardly, a mirror charge lever rotatably mounted on the mirror box, a retainer lever rotatably mounted on the body of the camera, a mirror drive lever rotatably journalled to the mirror box, a connector lever pivotally connected to the mirror drive lever and to a lever pivotally mounted on the mirror box, a lock lever rotatably mounted on the mirror box for locking the mirror drive lever, a diaphragm-interlocking lever rotatably journalled to the mirror box coaxially with the mirror drive lever, and a pressure spring provided between the mirror drive lever and the diaphragm-interlocking lever to urge these two levers into mutual engagement. The engagement at least between the mirror drive lever and the pressure spring is releasable. A mirror lifting-fixing lever is rotatably journalled to the mirror box for lifting and fixing the mirror, and a mirror actuator member is vertically slidably mounted to the body of the camera for actuating the mirror lifting-fixing lever and the diaphragm-interlocking lever. The mirror actuator member is formed with a retainer portion for releasing the engagement between the mirror drive lever and the pressure spring when the mirror is lifted and fixed.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
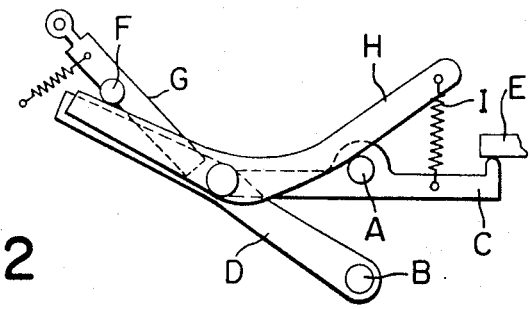
FIG. 1 illustrates a mirror mechanism according to the prior art.
Figure 2:
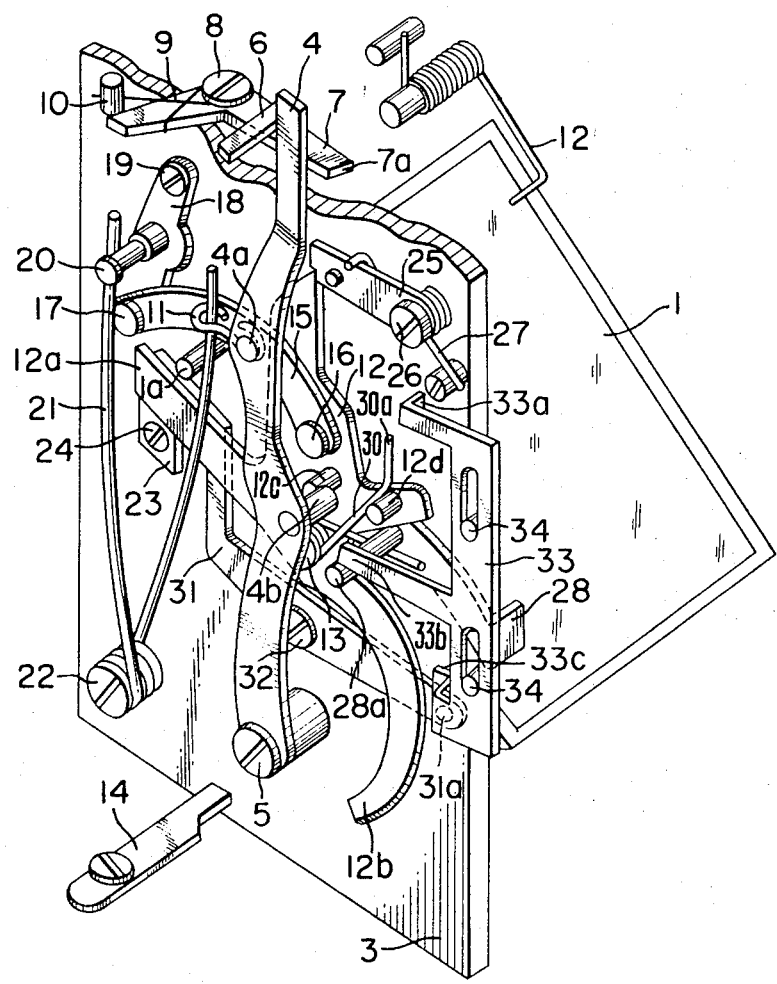
FIG. 2 is a perspective view of the device according to an embodiment of the present invention.
Figure 3:
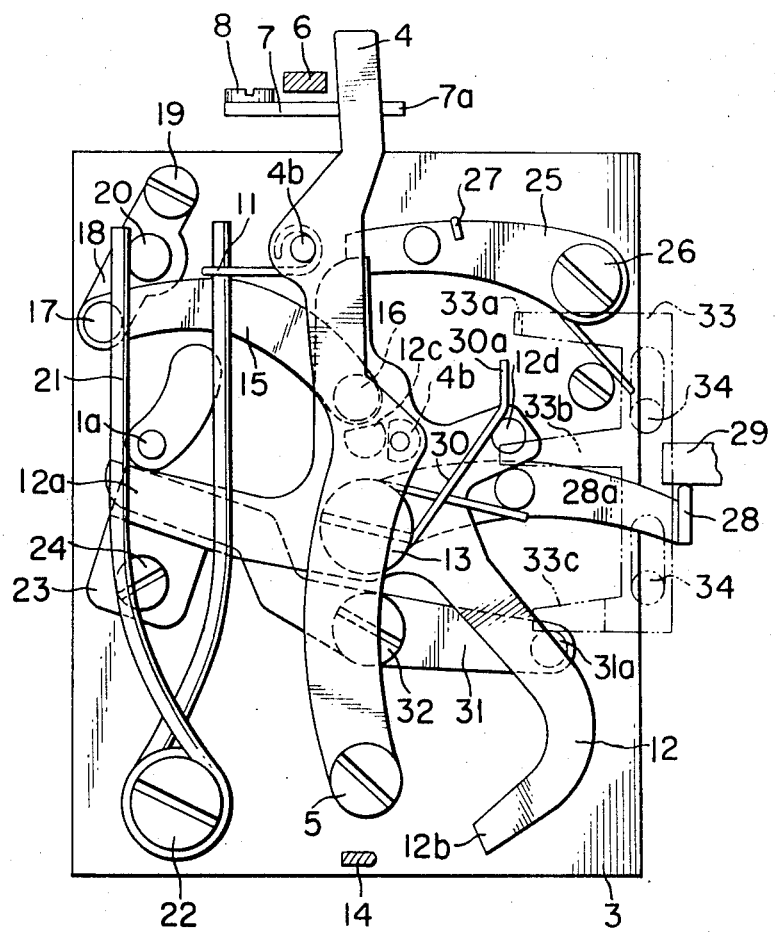
FIGS. 3 to 5 are plan views of the device of FIG. 2, showing the drive in different positions, i.e. a position prior to being charged, a position after charging and during shutter release, and a position in which the mirror is fixed at its lifted position.

In order that the present invention may be better understood, reference is first had to FIG. 1 which shows a mirror mechanism according to the prior art as in U.S. Pat. No. 3,442,192, to Sato which issued on May 6, 1969. To have the mirror fixed at its upper position, unshown operating means are operated to rotate a transmission member C and a mirror lifting-fixing lever D clockwise by means of pins A and B, respectively. As a result, a diaphragm lever E associated with the camera's lens is downwardly moved by the force of a spring (not shown) to stop down the aperture to a predetermined value and at the same time, a mirror G is lifted and fixed by means of pin F. When the shutter (not shown) is released, a mirror kick-up lever H is rotated by a drive mechanism (not shown) to actuate the shutter, whereafter the mirror kick-up lever H is rotated counter-clockwise to return to its initial position against the force of spring I. For the normal picture-taking mode, shutter release causes the mirror kick-up lever H to be rotated clockwise, the mirror G to be kicked up by means of pin F and the transmission member C to be rotated therewith by means of pin A, thus stopping down the aperture to a predetermined value.

When the shutter is released with the mirror G fixed at its upper position, the mirror kick-up lever H must be rotated counter-clockwise against the force of the spring I. For this purpose, a corresponding substantial driving force is required, and this in turn demands a heavier charging operation for the drive mechanism, as mentioned previously.

Referring now to FIGS. 2 to 5, there is shown an embodiment of the mirror mechanism according to the present invention. A mirror 1 is rotatably journalled to a mirror box 3 and normally biased downwardly by a spring 2. A mirror charge lever 4 is rotatably mounted on the mirror box 3 by means of a shaft 5, and may be rotated clockwise by an actuating lever 6 in response to wind-up operation of a wind-up lever (not shown) until retained by one end 7a of a retainer lever 7. The charge lever 4 has a holder pin 4a and an engaging pin 4b studded therein. Around the holder pin 4a is hooked a connector 11 having one end thereof hooked around one end of a mirror drive spring 21 which will later be described. The engaging pin 4b is engaged with an interlocking pin 12c studded in a mirror drive lever 12 which rotates counter-clockwise about the shaft 13 mounted in the mirror box 3, in response to the counter-clockwise rotation of the charge lever 4.

The retainer lever 7 is rotatably mounted on the body of a camera by means of a shaft 8 and biased clockwise by a spring 9. The retainer lever 7 is rotatable clockwise to retain the charge lever 4 and is stopped at its retaining position by a limit pin 10. The retainer lever 7 may release the mirror charge lever 4 in response to shutter closing operation.

The mirror drive lever 12 is formed with a mirror drive portion 12a engageable with a mirror pin 1a studded in the mirror 1, and a shutter release portion 12b engageable with a shutter release lever 14 for operating the shutter (not shown). It will thus be seen that clockwise rotation of the lever 12 will lift the mirror 1 and also release the shutter.

A connector lever 15 has the opposite ends thereof pivotally connected to the mirror drive lever 12 and a pivotable lever 18 by means of shafts 16 and 17, respectively. The lever 18 is pivotally mounted on the mirror box 3 by means of a shaft 19 and has a spring holder pin 20 studded therein. The mirror drive spring 21 is secured to a shaft 22 studded in the mirror box 3, and has one end portion for biasing the mirror charge lever 4 counter-clockwise by means of the connector 11, and the other end portion for biasing the pivotable lever 18 counter-clockwise by means of the spring holder pin 20. A limit member 23 is secured to the mirror box 3 by means of a screw 24 and serves to limit the counter-clockwise rotation of the mirror drive lever 12. A lock lever 25 for locking the mirror drive lever 12 is rotatably mounted on the mirror box 3 by means of a shaft 26 and is biased counter-clockwise by a spring 27. The lock lever 25 is rotatable clockwise in response to depression of a shutter release button (not shown) to release its locking action.

The members 1 to 27 described above constitute a conventional quick return mirror in which the mirror 1 is lifted and lowered by the force of the mirror drive spring 21 upon depression of the shutter release button while the shutter is opened and closed.

A diaphragm-interlocking lever 28 is rotatably journalled to the mirror box by means of the shaft 13, in common with the mirror drive lever 12, and the lever 28 serves to retain a diaphragm lever 29 (FIG. 3), associated with the camera's lens, against downward movement, as viewed. The diaphragm lever 29 is biased downwardly (i.e. in the direction for stop-down) by spring means (not shown), and may be moved downwardly upon retraction of the diaphragm-interlocking lever 28 thereby to stop down the aperture of the lens to a predetermined value. A pressure spring 30 is secured to the shaft 13, and has one end 30a thereof engaged with a spring holder pin 12d studded in the mirror drive lever 12 and the other end engaged with an interlocking pin 28a studded in the diaphragm-interlocking lever 28, thus urging the mirror drive lever 12 and the diaphragm-interlocking lever 28 into mutual engagement at the interlocking pin 28a. A mirror lifting-fixing lever 31 is rotatably journalled to the mirror box 3 by means of a shaft 32 and may be actuated by a mirror actuator member 33 to lift the mirror 1 alone and fix it at its lifted position. The actuator member 33 is slotted and mounted for vertical sliding movement along guide pins 34 studded in the camera body and received in the slots of the actuator member 33, in response to a suitable operating member provided externally of the camera body. The mirror actuator member 33 may be clip-stopped at its uppermost and its lowermost positions, respectively; and this member is formed with a retainer portion 33a rotatable with clockwise rotation of the mirror drive lever 12 to disengage the pressure spring 30 from the lever 12, a connecting portion 33b engaged with the interlocking pin 28a of the diaphragm-interlocking lever 28, and a connecting portion 33c engaged with a pin 31a studded in the mirror lifting-fixing lever 31. Thus, downward movement of the actuator member 33 will bring the retainer portion 33a into a position for engaging the end 30a of the pressure spring 30 so as to disengage this spring from the lever 12, and will also cause the connecting portion 33b to rotate the diaphragm-interlocking lever 28 clockwise against the force of the pressure spring 30 so as to stop down the lens aperture to a predetermined value. Further, the connecting portion 33c will be caused to rotate the mirror lifting-fixing lever 31 clockwise so as to lift and fix the mirror 1.

Figure 4:
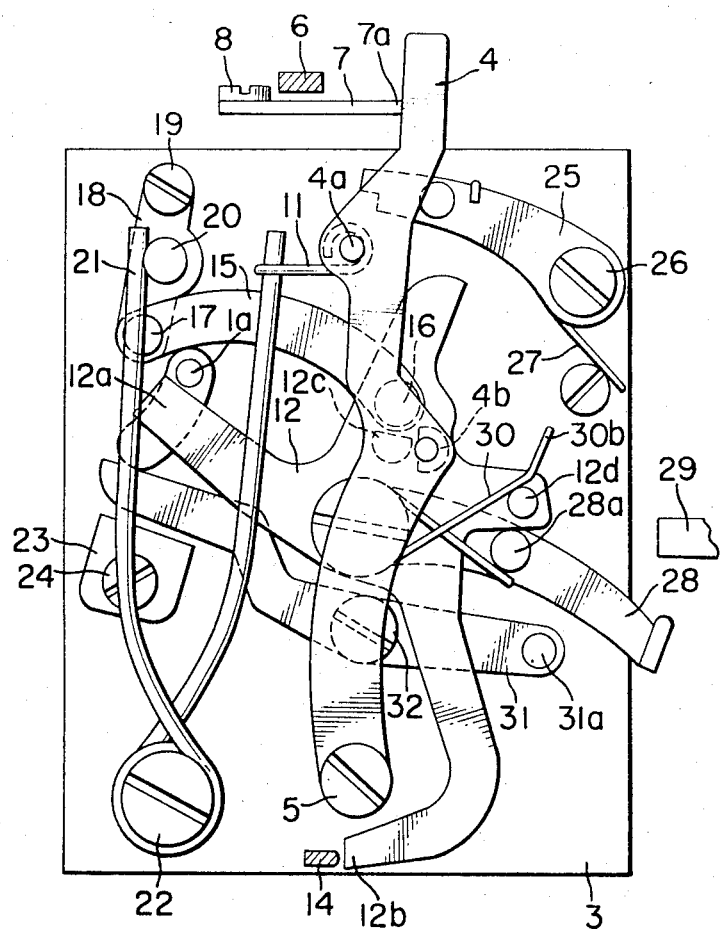

For a normal picture-taking operation to be effected with the above-described arrangement, a convenient wind-up lever (not shown) is rotated to turn the mirror charge lever 4 clockwise for a predetermined amount by means of the actuating lever 6 so as to charge the mirror drive spring 21 with a spring force, whereupon the lever 4 is retained by the retainer lever 7 against counter-clockwise rotation (see FIG. 4). When the shutter release button is depressed, the mirror drive lever 12 is unlocked from the lock lever 25 and rotated clockwise by the spring force of the mirror drive spring 21 via the pivotable lever 18 and connector lever 15, so that the mirror 1 is lifted by the mirror drive portion 12a via the mirror pin 1a while the diaphragm-interlocking lever 28 is rotated clockwise by means of the interlocking pin 28a thereby to stop down the lens aperture to a predetermined value. Further, at the final end of the clockwise rotation of the mirror drive lever 12, the shutter release portion 12b presses the shutter release lever 14 to open the shutter (not shown). Thereafter, in response to the closing of the shutter, the mirror charge lever 4 is released from the retainer lever 7, so that the lever 4 is rotated counter-clockwise by the force of the mirror drive spring 21 while the mirror drive lever 12 is also rotated counter-clockwise by means of the retainer pin 4b and interlocking pin 12c, thus lowering the mirror 1 and rotating the diaphragm-interlocking lever 28 counter-clockwise by means of the pressure spring 30 thereby to open the lens aperture.

Where a picture is to be taken with the mirror fixed at its upper position, the operating member is operated to cause the mirror actuator member 33 to slide downwardly (see FIG. 5), whereupon the retainer portion 33a is brought into position for retaining the end 30a of the pressure spring 30 while the connecting portion 33b rotates the diaphragm-interlocking lever 28 against the force of the pressure spring 30 to stop down the aperture, and further the connecting portion 33c rotates the mirror lifting-fixing lever 31 clockwise thereby to lift and fix the mirror 1. When the wind-up lever (not shown) is rotated, the mirror drive spring 21 is charged with a spring force, as described previously. Depression of the shutter button causes the mirror drive lever 12 to be rotated clockwise to open the shutter. Thereafter, in response to the closing of the shutter, the mirror drive lever 12 is rotated counter-clockwise as described above, and such rotation is free from any load imparted by the pressure spring because the lever 12 is now disengaged from the pressure spring 30.

Figure 5:
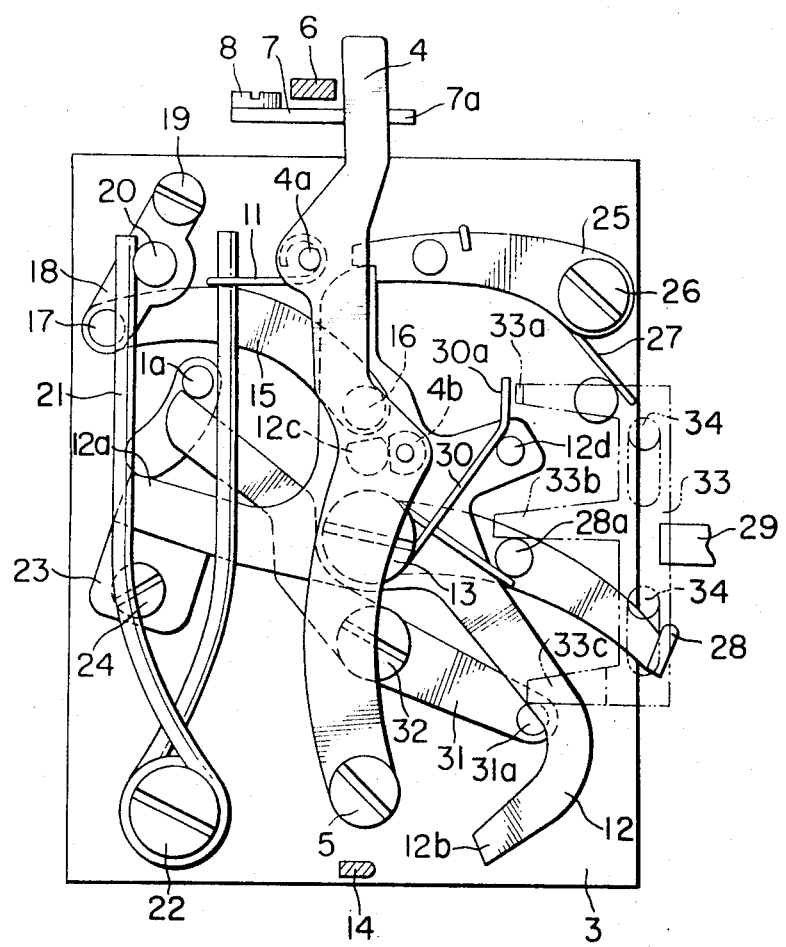

In the position of FIG. 5, a slight clearance may be present between the end 30a of the pressure spring 30 and the retainer portion 33a of the mirror actuator member 33. Thus, by the inertia resulting from the counterclockwise rotation of the mirror drive lever 12 subsequent to the clockwise rotation thereof, the mirror drive lever 12 may be rotated against the force of the pressure spring 30 until it is locked by the lot lever 25.

According to the construction and operation of the present invention as described hitherto, the mirror actuator member 33 retains the end 30a of the pressure spring 30 when the mirror is fixed at its upper position, thus allowing the rotation of the mirror drive lever 12 to be free from the force of the pressure spring 30. Therefore, the spring force of the mirror drive spring 21 may be less than in the conventional device of this type and accordingly, the force required to rotate the wind-up lever may be correspondingly smaller. Furthermore, the shock occurring in the operating portion of the device and the sound resulting therefrom may be reduced to improve the durability of such portion. In addition, the mirror actuator member 33, for actuating the diaphragm-interlocking lever 28 and mirror lifting-fixing lever 31, also serves as a member for releasing engagement between the mirror drive lever 12 and the pressure spring 30 when the mirror is lifted.

We believe that the construction and operation of our novel mirror mechanism will now be understood, and that its advantages will be fully appreciated by those persons skilled in the art.

We claim:

1. A mirror mechanism in a single-lens reflex camera comprising: a mirror box;
   a mirror rotatably journalled to said mirror box and normally spring-biased downwardly;
   mirror charge means rotatably mounted on said mirror box;
   a retainer lever rotatably mounted on the body of said camera;
   a mirror drive lever rotatably journalled to said mirror box;
   a connector lever pivotally connected to said mirror drive lever and to a pivotable lever pivotally mounted on said mirror box;
   a lock lever rotatably mounted on said mirror box for locking said mirror drive lever,
   a diaphragm-interlocking lever rotatably journalled to said mirror box coaxially with said mirror drive lever;
   a pressure spring provided between said mirror drive lever and said diaphragm-interlocking lever to urge these two levers into mutual engagement, the engagement at least between said mirror drive lever and said pressure spring being releasable;
   a mirror lifting-fixing lever rotatably journalled to said mirror box for lifting and fixing said mirror; and
   a mirror actuator member vertically slidably mounted to the body of said camera for actuating said mirror lifting-fixing lever and said diaphragm-interlocking lever, said mirror actuator member being formed with means for releasing the engagement between said mirror drive lever and said pressure spring when said mirror is lifted and fixed.

2. A mirror mechanism according to claim 1, wherein said pressure spring is secured to a common shaft on which said mirror drive lever and said diaphragm-interlocking lever are rotatably mounted, and said pressure spring has one end thereof engageable with said retainer portion of said mirror actuator member and the other end engaged with an interlocking member formed on said diaphragm-interlocking lever.

3. A mirror mechanism according to claim 1, wherein said mirror actuator member is operable by an operating member provided externally of said camera.

4. A mirror mechanism in a single-lens reflex camera comprising: a mirror box;
   a mirror rotatably journalled to said mirror box and normally spring-biased downwardly;
   mirror charge means rotatably mounted on said mirror box;
   a retainer lever rotatably mounted on the body of said camera;
   a mirror drive lever rotatably journalled to said mirror box;
   a connector lever pivotally connected to said mirror drive lever and to a pivotable lever pivotally mounted on said mirror box;
   a lock lever rotatably mounted on said mirror box for locking said mirror drive lever,
   a diaphragm-interlocking lever rotatably journalled to said mirror box coaxially with said mirror drive lever;
   a pressure spring provided between said mirror drive lever and said diaphragm-interlocking lever to urge these two levers into mutual engagement, the engagement at least between said mirror drive lever and said pressure spring being releasable;

a mirror lifting-fixing lever rotatably journalled to said mirror box for lifting and fixing said mirror; and a mirror actuating member formed with means for releasing the engagement between the mirror drive lever and said pressure spring, connecting means for actuating said mirror lifting-fixing lever, and means for actuating said diaphragm-interlocking lever to effect stop-down of the lens aperture to a predetermined value when said mirror is lifted and fixed.

* * * * *